United States Patent
Tajima et al.

(10) Patent No.: US 11,892,826 B2
(45) Date of Patent: Feb. 6, 2024

(54) ANOMALY DETECTION SYSTEM

(71) Applicant: Hitachi, Ltd., Tokyo (JP)

(72) Inventors: Yoshiyuki Tajima, Tokyo (JP); Kazuya Monden, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 574 days.

(21) Appl. No.: 17/256,070

(22) PCT Filed: May 29, 2019

(86) PCT No.: PCT/JP2019/021407
§ 371 (c)(1),
(2) Date: Dec. 24, 2020

(87) PCT Pub. No.: WO2020/008760
PCT Pub. Date: Jan. 9, 2020

(65) Prior Publication Data
US 2021/0224599 A1    Jul. 22, 2021

(30) Foreign Application Priority Data
Jul. 4, 2018    (JP) ................ 2018-127570

(51) Int. Cl.
*G05B 23/02* (2006.01)
*G06F 18/214* (2023.01)
(Continued)

(52) U.S. Cl.
CPC .......... *G05B 23/024* (2013.01); *G05B 23/02* (2013.01); *G06F 18/214* (2023.01); *G06F 18/2451* (2023.01); *G06F 18/24147* (2023.01)

(58) Field of Classification Search
CPC . G05B 23/024; G05B 23/02; G06F 18/24147; G06F 18/214; G06F 18/2451
See application file for complete search history.

(56) References Cited

U.S. PATENT DOCUMENTS 11,586,853 B2 * 2/2023 Iyer ................. G06F 18/24137
2011/0288836 A1 * 11/2011 Lacaille ............ G05B 23/0254
703/2

(Continued)

FOREIGN PATENT DOCUMENTS

JP    2013-25367 A     2/2013
JP    2013-218725 A   10/2013
(Continued)

OTHER PUBLICATIONS

International Search Report (PCT/ISA/210) issued in PCT Application No. PCT/JP2019/021407 dated Sep. 3, 2019 with English translation (five (5) pages).
(Continued)

*Primary Examiner* — Pinalben Patel
(74) *Attorney, Agent, or Firm* — Crowell & Moring LLP

(57) ABSTRACT

There are provided a device that collects operation data from equipment, and an information processing apparatus that detects an anomaly or an omen of an anomaly of the equipment on the basis of anomaly detection models constructed from the operation data, the information processing apparatus including means for collecting the operation data, means for learning anomaly detection models from the operation data, and means for calculating an anomaly score of respective operation data from the operation data and the anomaly detection models, the means for learning an anomaly detection model in which a dispersion of elements is small among the anomaly detection models. Thus, in an anomaly detection system, when the operation state of equipment is monitored, even if data for performing division of operation states cannot be obtained or even if division cannot be performed correctly, misdetection of an anomaly such as a malfunction or a failure or an omen of an anomaly
(Continued)

can be decreased and the state of the system can be evaluated correctly.

8 Claims, 9 Drawing Sheets

(51) Int. Cl.
    *G06F 18/2451*      (2023.01)
    *G06F 18/2413*      (2023.01)

(56) References Cited

U.S. PATENT DOCUMENTS

| | | | |
|---|---|---|---|
| 2012/0041575 A1 | 2/2012 | Maeda et al. | |
| 2012/0290879 A1 | 11/2012 | Shibuya et al. | |
| 2017/0083670 A1 | 3/2017 | Kosaka et al. | |
| 2018/0365089 A1 | 12/2018 | Okanohara et al. | |
| 2020/0143252 A1* | 5/2020 | Dasgupta | G06N 20/10 |
| 2021/0034581 A1* | 2/2021 | Boven | G06N 3/08 |
| 2022/0044133 A1* | 2/2022 | Otto | G06F 18/214 |
| 2022/0308895 A1* | 9/2022 | Ben-Elazar | G06N 5/025 |
| 2023/0088241 A1* | 3/2023 | Streichert | G05B 23/0254 706/12 |
| 2023/0229738 A1* | 7/2023 | Cleere | G06N 20/20 706/12 |

FOREIGN PATENT DOCUMENTS

| | | | | |
|---|---|---|---|---|
| JP | 2015-172945 A | | 10/2015 | |
| JP | 2015-184693 A | | 10/2015 | |
| JP | 2015172945 A | * | 10/2015 | G05B 23/021 |
| JP | 6313516 B1 | * | 4/2018 | |
| JP | 6313516 B1 | | 4/2018 | |
| WO | WO 2017/094267 A1 | | 6/2017 | |

OTHER PUBLICATIONS

Japanese-language Written Opinion (PCT/ISA/237) issued in PCT Application No. PCT/JP2019/021407 dated Sep. 3, 2019 (five (5) pages).

* cited by examiner

OPERATION DATA 100

| DATE AND TIME | ITEM NAME | VALUE |
|---|---|---|
| 2017/1/1 16:52:24 | CONTROLLER 1. TEMPERATURE | 23.4 |
| 2017/1/1 16:52:26 | CONTROLLER 1. TEMPERATURE | 24.5 |
| 2017/1/1 16:52:28 | CONTROLLER 1. TEMPERATURE | 24.7 |
| 2017/1/1 16:52:24 | CONTROLLER 1. PRESSURE | 128 |
| 2017/1/1 16:52:26 | CONTROLLER 1. PRESSURE | 126 |
| 2017/1/1 16:52:28 | CONTROLLER 1. PRESSURE | 129 |
| ... | ... | ... |

MONITORING UNIT DEFINITION DATA 200

FIG.5

MODEL DATA 300

| MODEL ID | SUB MODEL ID | MODEL PARAMETER | WEIGHT |
|---|---|---|---|
| 1001 | 0 | [[1.84, 4.31, ...], [1.72, 4.11, ...], ...] | 1.0 |
| 1001 | 1 | [[2.74, 1.22, ...], [2.92, 2.13, ...], ...] | 0.34 |
| ... | ... | ... | ... |
| ... | ... | ... | ... |
| 1001 | -1 | [[1.94, 1.28, ...], [1.85, 3.22, ...], ...] | 1 |
| ... | ... | ... | ... |

ANOMALY DETECTION RESULT DATA 400

| DATE AND TIME | MODEL ID | INITIAL ANOMALY SCORE | ANOMALY SCORE |
|---|---|---|---|
| 2017/1/1 15:43:24 | 1001 | 2.1 | 1.9 |
| 2017/1/1 16:22:11 | 1001 | 4.0 | 2.2 |
| 2017/1/1 18:12:08 | 1001 | 18.2 | 17.3 |
| ... | ... | ... | ... |

401 402 403 404

ANOMALY DETECTION SYSTEM

TECHNICAL FIELD

The present invention relates to an anomaly detection system, and particularly to an anomaly detection system that is suitable to reduce misdetection of an anomaly such as a malfunction or a failure or an omen of an anomaly to evaluate the state of the system accurately in order to achieve stabilized operation of the system including a calculator, a controller, apparatus and equipment, and the like.

BACKGROUND ART

Many systems such as industrial systems in factories, chemical plants, and social infrastructure systems such as railroads and electric power are configured from a plurality of calculators, controllers, and apparatus and equipment. In such a system as described, if a function of the system stops, then there is the possibility that serious damage may be caused economically and publicly. Therefore, it is important to discover and respond to a malfunction or a failure quickly or previously predict a malfunction or a failure in order to maintain the function so as not to stop the function of the system. Nowadays, since a great amount of operation data can be obtained from a calculator, a controller, apparatus and equipment, and so forth, a method for detecting an anomaly or an omen of an anomaly based on a statistical method has been taken in regard to a behavior of apparatus and equipment or a system in a normal operation condition.

Such anomaly omen detection in equipment in a plant or the like as above is described, for example, in Patent Document 1. In the equipment state monitoring system disclosed in Patent Document 1, even if the system has various normal states, in order to prevent occurrence of misinformation deciding a normal state as an anomaly and to enable making descriptions of the ground of an anomaly decision and association between an anomaly omen and an event, mode division is performed for each of different operation states on the basis of an event signal outputted from equipment, a normal model is created for each mode, and then sufficiency of learning data is checked for each mode. Then, anomaly identification is performed using a threshold value set according to a result of the check.

Meanwhile, in the case where the system is measured, an operation state in which only a small amount of data can be collected such as activation, deactivation, and calibration and another operation state in which many data can be collected such as steady operation are available. In operation data where such a plurality of operation states are mixed, there is a tendency that low density or minority operation data in a normal condition is relatively high in the anomaly score in comparison with high density or majority operation data in a normal condition, and the tendency causes misdetection. Here, each of the low density and the high density is an amount that indicates by what degree the value of the operation data can be taken, and the minority signifies that the frequency by which the value of the operation data can be taken is low and the majority signifies that the frequency by which the value of the operation data can be taken is high.

PRIOR ART DOCUMENT

Patent Document

Patent Document 1: JP-2015-172945-A

SUMMARY OF THE INVENTION

Problem to be Solved by the Invention

The technology disclosed in Patent Document 1 has a basic idea in which mode division is performed (for the operation state of a system) based on an event signal.

However, in the equipment state monitoring method disclosed in Patent Document 1 does not take into consideration the method of anomaly detection in a case where an event signal is not obtained, and thus, in the case where an event signal is not obtained, this method of anomaly detection cannot be applied. Further, when division of a mode cannot be performed correctly using an event signal, there is the possibility that misdetection may not be eliminated.

It is an object of the present invention to provide an anomaly detection system in which, when the operation state of equipment is monitored, for data outputted in an ordinary condition in a plurality of operation states, even if data for performing division of operation states cannot be obtained or even if division cannot be performed correctly, misdetection of an anomaly such as a malfunction or a failure or an omen of an anomaly can be decreased and the state of the system can be evaluated correctly.

Means for Solving the Problem

According to the present invention, there is provided an anomaly detection system that detects an anomaly or an omen of an anomaly of equipment of a monitoring target on the basis of operation data of the equipment, including a device that collects operation data from the equipment, and an information processing apparatus that detects an anomaly or an omen of an anomaly on the basis of anomaly detection models constructed from the operation data. Further, the information processing apparatus includes means for collecting the operation data, means for learning anomaly detection models from the operation data, and means for calculating an anomaly score of respective operation data from the operation data and the anomaly detection models, and the means for learning an anomaly detection mode from the operation data learn an anomaly detection model in which a dispersion of elements of the anomaly detection model is small among the anomaly detection models.

Advantages of the Invention

According to the present invention, an anomaly detection system can be provided in which, when the operation state of equipment is monitored, for data outputted in an ordinary condition in a plurality of operation states, even if data for performing division of operation states cannot be obtained or even if division cannot be performed correctly, misdetection of an anomaly such as a malfunction or a failure or an omen of an anomaly can be decreased and the state of the system can be evaluated correctly.

BRIEF DESCRIPTION OF THE DRAWINGS

FIG. 5 is a view depicting an example of model data.

FIG. 6 is a view depicting an example of anomaly detection result data.

MODES FOR CARRYING OUT THE INVENTION

Figure 1:
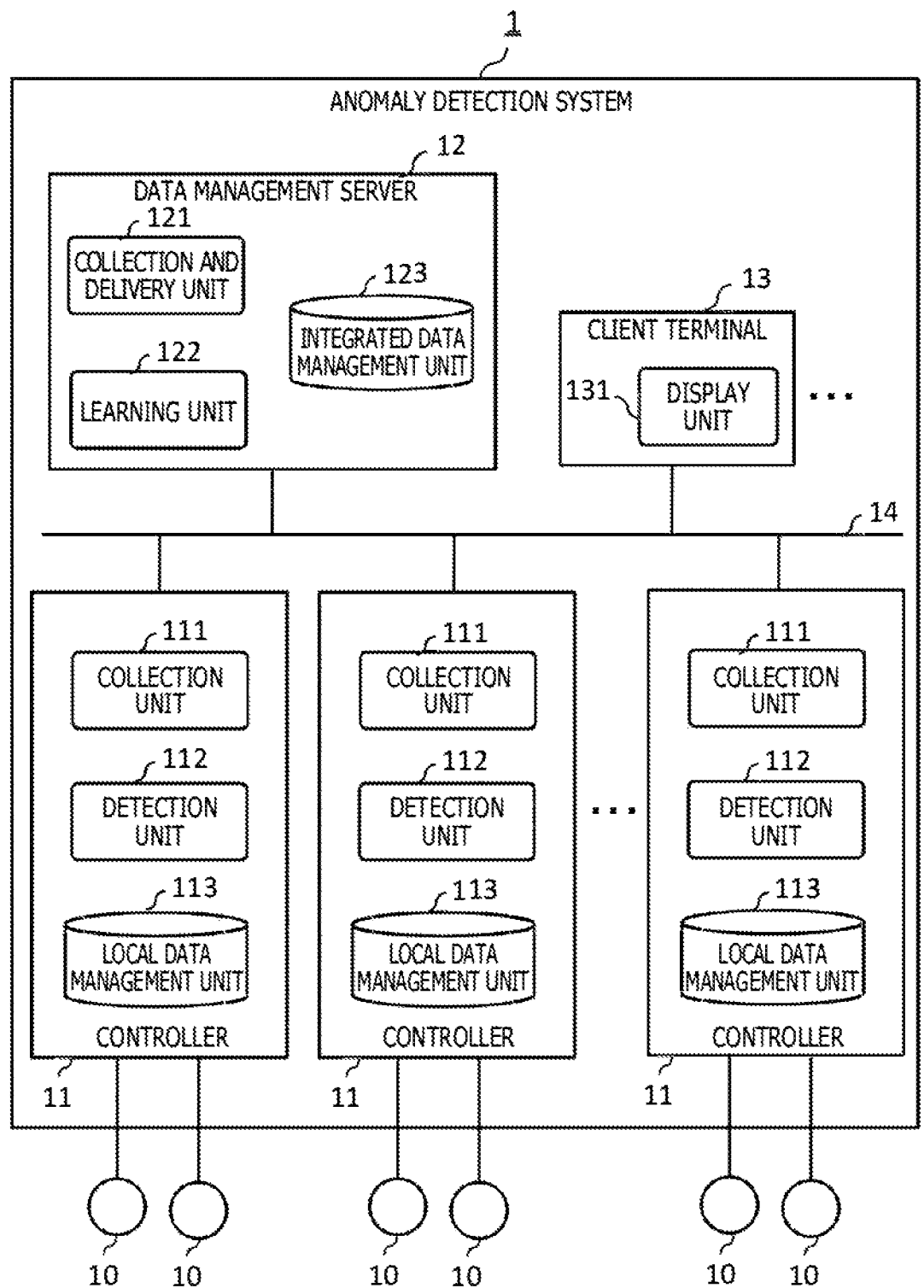
FIG. 1 is a block diagram depicting a system configuration of an anomaly detection system.

In the following, an embodiment of the present invention is described with reference to FIGS. 1 to 10.

First, in order to have the invention understood, an overview of an anomaly detection system according to the embodiment of the present invention is described.

The anomaly detection system according to the embodiment of the present invention is a system for discovering and responding to a malfunction or a failure quickly or previously predicting a malfunction or a failure in order to maintain the function such that the function of the system such as an industrial system in a factory or a social infrastructure system such as a chemical plant, a railway, or an electric power system does not stop.

Processes of an anomaly detection system are divided into a learning phase of constructing an anomaly detection model from operation data that are normal or are expected to be normal (such operation data are hereinafter referred to simply as normal operation data and a monitoring phase of calculating, upon monitoring, an anomaly score using operation data and the anomaly detection model and then notifying a user of the anomaly score and displaying related information.

In the learning phase, an anomaly detection model is first learned from operation data collected from various apparatus and equipment. Although various models of mechanical learning can be adopted as the anomaly detection model, in the description of the present embodiment, an example that uses a model based on the k-nearest neighbor method is described. It is noted that also it is possible to use a model of different mechanical learning or statistics. In the learning process, a first anomaly detection model based on the k-nearest neighbor method is learned first using normal operation data as training data. The k-nearest neighbor method is referred to as lazy learning and merely stores, from its nature, training data into a memory without processing fetched data.

Then, bootstrap sampling is performed for the training data to create one or a plurality pieces of new training data. Here, the bootstrap sampling is a statistical sampling method of extracting n pieces of data from n pieces of data of a target forgiving duplication. Then, one or a plurality of new anomaly detection models are created using the created training data. In the case where an anomaly detection model (referred to as "ensemble model") created by combination of the original anomaly detection model and the newly created anomaly detection model indicates a variance of the anomaly scores that is small in comparison with the original anomaly detection model, the ensemble model is replaced with the original anomaly detection model. In the present embodiment, as a specific method for the combination, a method based on the weighted linear sum is used. At this time, the balance (weight) of the combination is determined searching for a best one by line search or the like. Such a sequence of processes is repeated by the predetermined number of times to configure an anomaly detection model having a minimum variance. It is noted that the variance of the anomaly scores is one index that provides a dispersion, and some other index, for example, IQR (Inter Quartile Range) may be used.

In the monitoring phase, an anomaly score is calculated using operation data at the time of monitoring and an anomaly detection model. In the case where the anomaly score exceeds a predetermined threshold value, it is determined that an anomaly or an omen of an anomaly has occurred, and a notification of the anomaly situation is issued to the user. At this time, the dissociation in anomaly score between the original anomaly detection model and the final anomaly detection model is presented additionally. This makes it possible for the system to give a suggestion to the user whether the detection result is based on low density or minority operation data in a normal condition or is based on high density or majority operation data in a normal condition.

It is noted that, although, in the present embodiment, the method based on the weighted linear sum is indicated as one example of the method of combining an anomaly detection model, a different method may be used for the combination. Further, it is necessary to calculate the number of ensemble models equal to the number of anomaly detection models combined in the detection process. Therefore, a different model may be learned using ensemble models. For example, so-called self-taught learning of learning an anomaly score for a training data set of an ensemble model with a regression model (a model that represents certain two variables using an estimate formula by a statistical method) may be performed. Further, an anomaly detection model may be constructed using training data created by sampling data sets configuring individual ensemble models according to the weights of the models. This makes it possible to re-construct an anomaly detection model that has similar natures and is comparatively light in calculation amount.

Now, a configuration of the anomaly detection system according to the embodiment is described with reference to FIGS. 1 and 2.

As depicted in FIG. 1, the anomaly detection system 1 according to the present embodiment includes equipment 10, controllers 11, a data management server 12, and a client terminal 13.

The equipment 10 is a production line in a factory or the like and includes sensors and actuators. The sensors include an acceleration sensor, a temperature sensor, a pressure sensor and so forth. Each controller 11 controls the sensors and the actuators of the equipment 10 and performs an anomaly detection process. The data management server 12 is a server apparatus that performs data management of operation data uploaded from the equipment 10 and learning of an anomaly detection model. The client terminal 13 is an apparatus that displays and presents information relating to an anomaly or an omen of an anomaly to a user.

The components of the anomaly detection system 1 are connected to each other by a network such as a LAN (Local Area Network). It is noted that, although, in the present embodiment, the components are connected to each other by a LAN, they may otherwise be connected to each other through a global network such as the Internet. Further, the configuration depicted in FIG. 1 is an example, and the number of components may be increased or decreased or one component may be responsible for a plurality of functions. For example, the controller may be responsible for the role of the data management server 12. Furthermore, the network components are not limited to those that are connected to each other by a single network as in the present embodiment but may be connected hierarchically. It is noted that, although the present embodiment describes a case in which the equipment 10 is a monitoring target, the controller 11 or some other calculator may be a monitoring target.

The controller 11 of the anomaly detection system 1 includes functioning units of a collection unit 111, a detection unit 112, and a local data management unit 113.

The collection unit 111 is a functioning unit that collects operation data from the equipment 10. The detection unit 112 is a functioning unit that calculates an anomaly score from the operation data (details are hereinafter described). The local data management unit 113 is a functioning unit that manages the collected operation data and provides an accessing method.

The data management server 12 of the anomaly detection system 1 includes a collection and delivery unit 121, a learning unit 122, and an integrated data management unit 123.

The collection and delivery unit 121 is a functioning unit that collects data from the local data management units 113 of the controllers 11. The learning unit 122 is a functioning unit that constructs (learns) an anomaly detection model using operation data. The integrated data management unit 123 is a functioning unit that aggregates operation data stored in the local data management units 113 of the controllers 11 and manages the operation data on the server side and provides an accessing method.

The client terminal 13 of the anomaly detection system 1 includes a display unit 131. The display unit 131 is a functioning unit that displays information relating to an anomaly or an omen of an anomaly to the user.

Next, correspondence of the functioning units of the components of the anomaly detection system and hardware is described with reference to FIGS. 1 and 2.

Figures 2, 3:
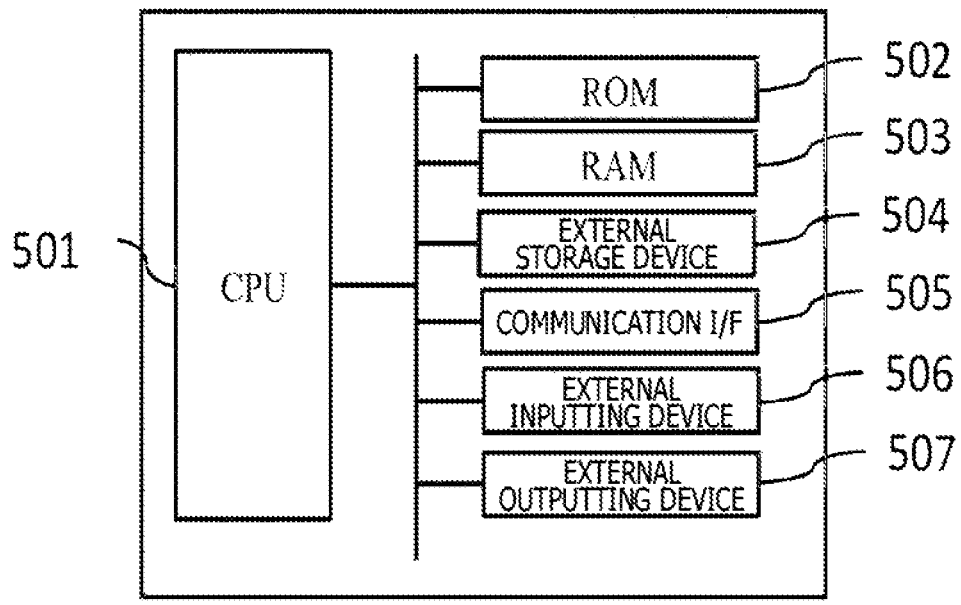
FIG. 2 is a block diagram depicting a hardware configuration of an information processing apparatus for implementing a data management server, a client terminal, a controller and so forth.
FIG. 3 is a view depicting an example of operation data.

The components of the anomaly detection system can be implemented by such a general information processing apparatus as depicted in FIG. 2.

In the general information processing apparatus, a CPU (Central Processing Unit) 501 includes a ROM (Read Only Memory) 502, a RAM (Random Access Memory) 503, an external inputting device 504, a communication I/F (Interface) 505, an external inputting device 506, and an external outputting device 507.

The CPU 501 is a processor that executes a program on the RAM 503 and controls the components of the apparatus. The ROM 502 is a non-rewritable semiconductor storage device. The RAM 503 is a semiconductor storage device that temporarily retains a program and data. The external inputting device 504 is a large capacity magnetic storage device or semiconductor storage device that retains data and programs. The communication I/F 505 is a device that controls communication with an external network. The external inputting device 506 is a device that allows the user of a mouse, a keyboard, and so forth to input data. The external outputting device 507 is a display device such as an LCD (liquid crystal display device), a printer that prints data, and so forth.

The collection unit 111, detection unit 112, and local data management unit 113 of the controller 11 are either retained as programs for implementing the individual functions in the ROM 502 or installed in the external inputting device 504 and loaded into the RAM 503 and then executed by the CPU 501.

Similarly, the collection and delivery unit 121, learning unit 122, and integrated data management unit 123 of the data management server 12 of the anomaly detection system 1 are either retained as programs for implementing the individual functions in the ROM 502 or installed into the external inputting device 504 and loaded into the RAM 503 and then executed by the CPU 501.

Furthermore, for the display unit 131 of the client terminal 13, a display program is either retained in the ROM 502 or installed into the external inputting device 504, loaded into the RAM 503, and executed by the CPU 501 so as to be displayed on a display device such as a liquid crystal display device.

Now, a data structure used in the anomaly detection system is described with reference to FIGS. 3 to 6.

Operation data 100 is data collected from the equipment 10 by the controller 11 and is managed by the local data management unit 113, and is, specifically, data relating to sensor values of the sensors attached to the equipment 10 and control signals to be sent to the equipment 10, for example. As depicted in FIG. 3, the operation data 100 includes items for a date and time 101, an item name 102, and a value 103. The date and time 101 is date and time when operation data is generated or collected. The item name 102 is a name for identifying operation data and is, for example, a sensor number or a control signal number. The value 103 is a value of operation data of the date and time and the item.

It is noted that also the operation data managed by the integrated data management unit 123 of the data management server 12 is similar in contents and is integration of the operation data 100 of the local data management unit 113 of the controllers 11.

Figure 4:
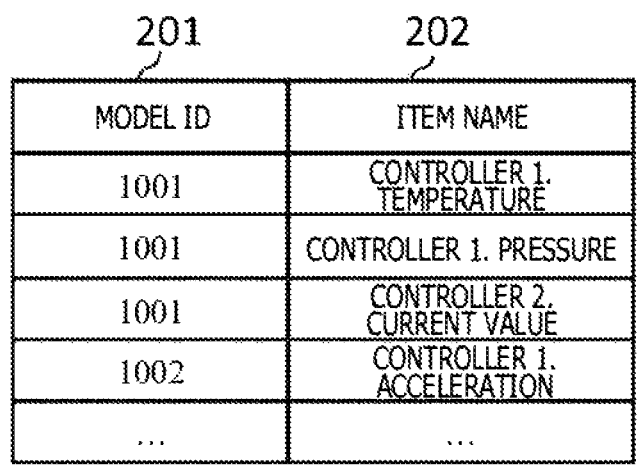
FIG. 4 is a view depicting an example of monitoring unit definition data.

Monitoring unit definition data 200 is data that defines data to be used to configure anomaly detection models and is managed by the local data management unit 113 of the controller 11 and the integrated data management unit 123 of the data management server 12. As depicted in FIG. 4, the monitoring unit definition data 200 includes items of a model ID 201 and an item name 202. The model ID 201 is an ID for uniquely identifying an anomaly detection model. The item name 202 is data with which a designated item name configures an anomaly detection model. For example, the first to third lines (except the line for a column name) from above depicted in FIG. 4 describe about an anomaly detection model whose mode ID is 1001 and represent that the anomaly detection model is configured from "controller 1. temperature," "controller 1. Pressure," and "controller 2. current value." It is noted that, when an anomaly detection model is configured, it may be configured with one or a plurality of data at a certain point of time or may be configured with data at a plurality of points of time, namely, with time series data.

Model data 300 is data representative of an anomaly detection model and is managed by the local data management unit 113 of the controller 11 and the integrated data management unit 123 of the data management server 12. The model data 300 has items of a model ID 301, a sub model ID 302, a model parameter 303, and a weight 304. The model ID 301 is an ID for uniquely identifying an anomaly detection model. The sub model ID 302 is an ID for uniquely identifying a sub model of an anomaly detection model configuring each anomaly detection model (each ensemble model). It is noted that, when ID=0, this indicates an initial anomaly detection model, and an anomaly detection model is combined stepwise with 1, 2, and 3 of the sub model ID. On the other hand, when the sub model ID is −1, this represents an anomaly detection model obtained by reconstructing an ensemble model (details are hereinafter described). The model parameter 303 is a parameter for representing each anomaly detection model. Since anomaly detection by the k-nearest neighbor method merely stores training data as described above, the model parameter 303 is also training data for each anomaly detection model. The weight 304 represents a degree of importance of each anomaly detection model when synthesis (ensemble) is performed.

Anomaly detection result data 400 is data representative of a result of anomaly detection and is managed by the local data management unit 113 of the controller 11 and the integrated data management unit 123 of the data management server 12. The anomaly detection result data 400 has items of a date and time 401, a model ID 402, an initial anomaly score 403, and an anomaly score 404. The date and time 401 represents date and time when a detection process is performed about whether or not there is an anomaly or an omen of an anomaly. The model ID 402 is an ID for uniquely identifying an anomaly detection model. The initial anomaly score 403 is an anomaly score calculated using an anomaly detection model when the sub model ID 302 is 0. The initial anomaly score 403 is an anomaly score calculated, when −1 does not exist in the sub model ID 302, using an ensemble model, and calculated, when −1 exists in the sub model ID 302, using an anomaly detection model when the sub model ID 302 is −1, namely, using a re-constructed anomaly detection model.

Figure 7:
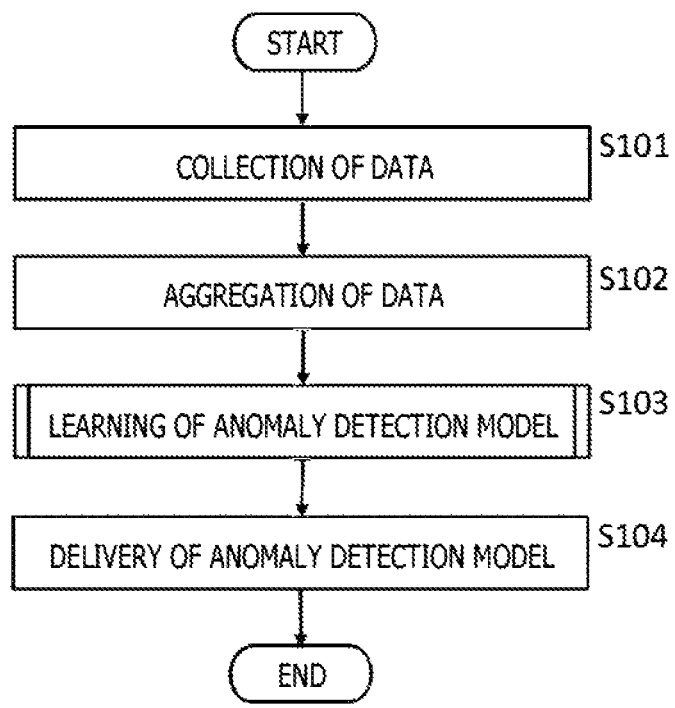
FIG. 7 is a flow chart depicting an overview of entire processing in the anomaly detection system.
Figure 8:
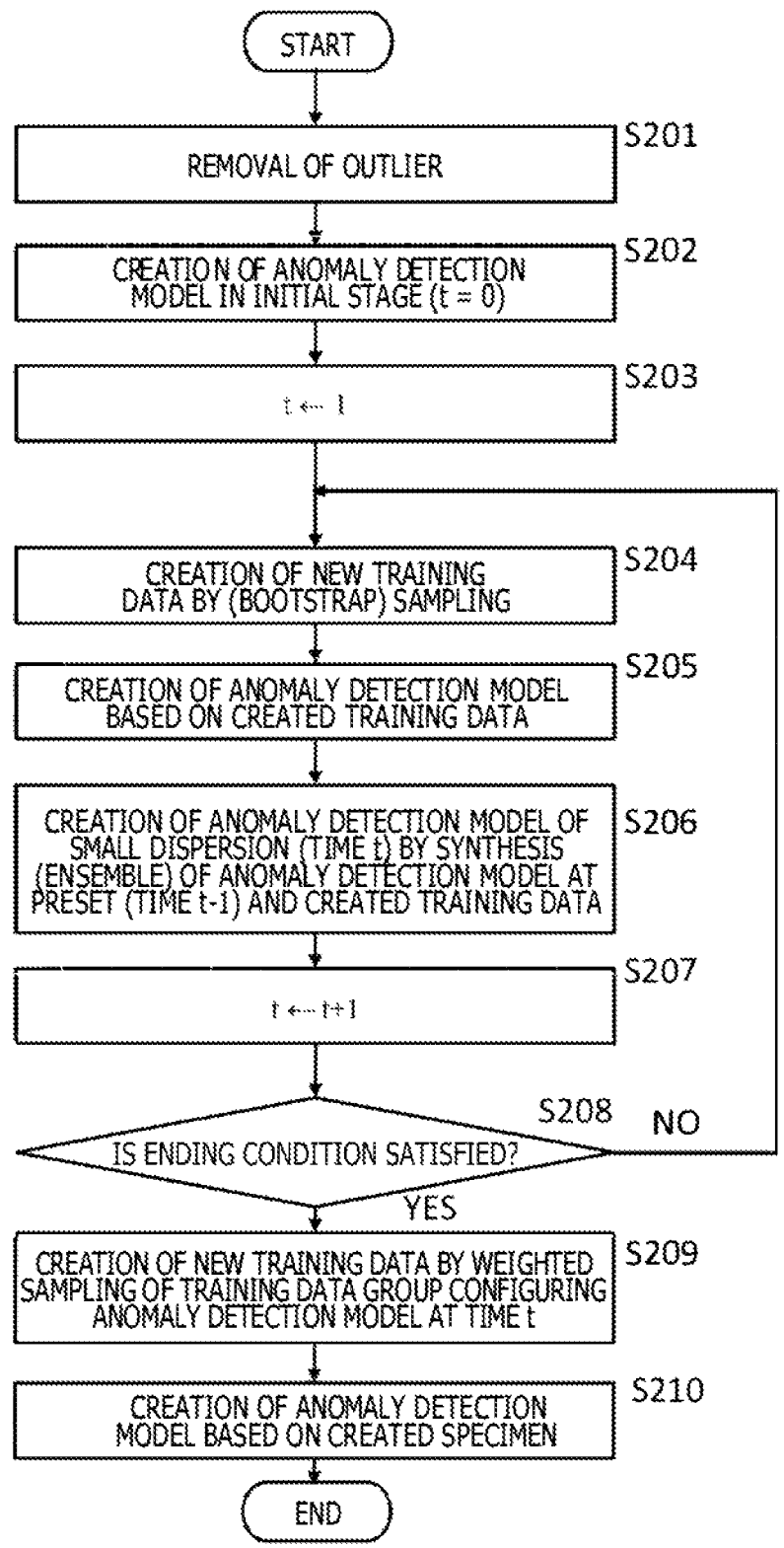
FIG. 8 is a flow chart depicting a learning phase in the anomaly detection system.
Figure 9:
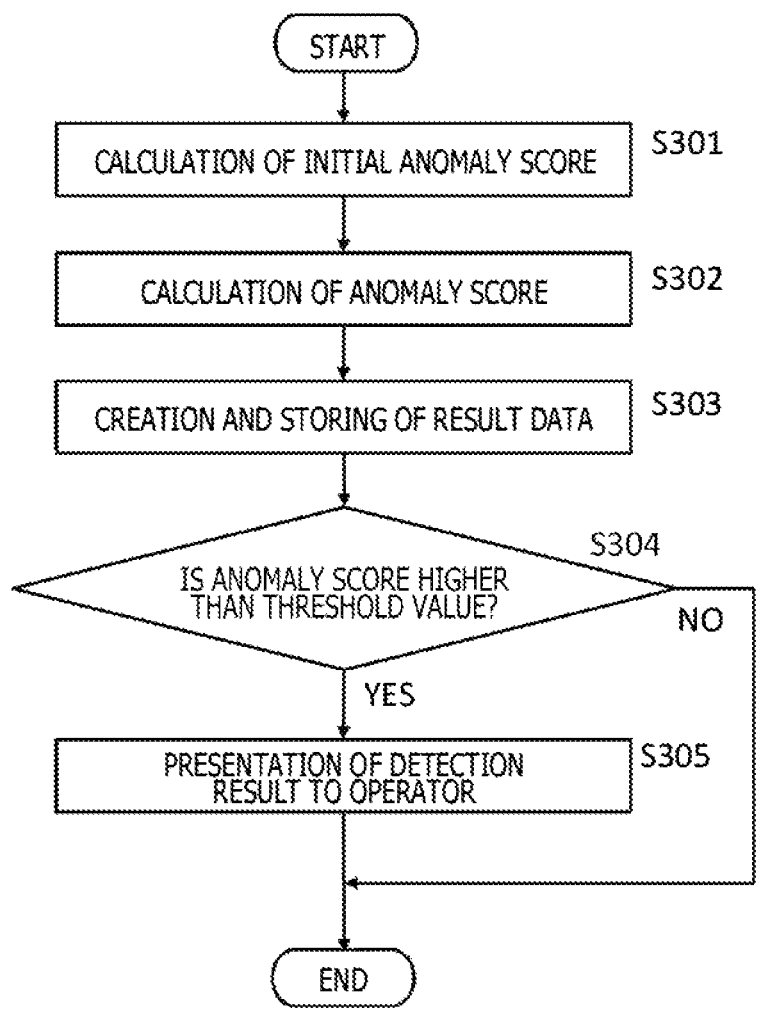
FIG. 9 is a flow chart depicting a monitoring phase in the anomaly detection system.

Now, processing of the anomaly detection system is described with reference to FIGS. 7 to 9.

First, an overview of the entire processing of the anomaly detection system is described with reference to FIG. 7.

First, the collection unit 111 of the controller 11 collects the operation data 100 in a normal condition from both or one of the equipment 10 and the controller 11, and stores the collected operation data 100 in a normal condition into the local data management unit 113 (S101). Note that it is assumed that, in the present embodiment, the period of data collected by the collection unit 111 is fixed. If the period is not fixed, the operation data 100 is converted into operation data adjusted in period by interpolation or the like and then stored into the local data management unit 113.

Then, the collection and delivery unit 121 of the data management server 12 aggregates the operation data 100 stored in the local data management unit 113 of the controllers 11 and stores the aggregated operation data 100 into the integrated data management unit 123 of the data management server 12 (S102).

Then, the learning unit 122 of the data management server 12 constructs (learns) an anomaly detection model using the operation data 100 associated, in item name, with the model ID in the monitoring unit definition data 200 (S103). Note that it is assumed that, prior to this processing, appropriate monitoring unit definition data 200 is registered and association between the model ID and the operation data 100 is completed already. It is noted that the process of constructing (learning) an anomaly detection model is hereinafter described in detail.

Then, the learning unit 122 registers model data 300 that is a result of the learning process into the integrated data management unit 123 of the data management server 12.

Finally, the collection and delivery unit 121 of the data management server 12 delivers the model data 300 of the integrated data management unit 123 to the controllers 11 and ends the present processing (S104). It is noted that, although, in the present embodiment, the operation data is used as it is, such a preprocess as applying a low-pass filter to the operation data 100 or normalizing the operation data 100 may be carried out.

Now, a construction (learning) process of an anomaly detection model is described in detail with reference to FIG. 8.

First, the learning unit 122 of the data management server 12 removes outlier values using an outlier detection method represented by a LOF (Local Outlier Factor) (S201). For example, assuming that 1% of operation data is an outlier, any operation data that fits to the upper 1% of the score of the LOF is deleted. As a result of constructing an anomaly detection model such that the dispersion of the anomaly scores including outliers is reduced by using the present anomaly detection method, deterioration of the search performance can be avoided. Especially, this is effective in a case where operation data includes random noise. However, the present step may be omitted for such data that does not require removal of an outlier.

Then, the learning unit 122 of the data management server 12 creates an anomaly detection model in an initial stage based on the k-nearest neighbor method using operation data in a normal condition as training data (S202). Where the training data is $X_0\_i=\{X_0\_i|i=1, 2, 3, \ldots, N\}$ and Nearest $(X_0, x, k)$ is the distance between the element x in the training data $X_0$ and the k th nearest point of the element x (k-nearest distance of x), the anomaly score $S_0$ of the anomaly detection model in the initial stage is given by the (Formula 1) below. At this time, the training data $X_0$ corresponds to the model parameter 303 when the sub model ID 302 depicted in FIG. 5 is 0. It is noted that, although, in the present embodiment, an arithmetic mean of the k-nearest distances up to the k th is used for the anomaly score, only the kth k-nearest distance may be used instead. It is noted that, when the distance calculation becomes a bottleneck, a method of approximating distance calculation such as binary hashing or a PQ (Product Quantization) method may be used. Thus, the load of the distance calculation can be reduced significantly.

[Expression 1]

$$S_0(x) = \frac{1}{K}\sum_{k=1}^{K}\text{Nearest}(X_0, x, k) \qquad \text{(Formula 1)}$$

Then, the learning unit 122 of the data management server 12 sets a variable t representing time to 1 (S203).

Then, the learning unit 122 of the data management server 12 creates new training data $X_t$ by bootstrap sampling of the training data (S204). At this time, the sampling is performed according to the probability P(x) given by the (Formula 2) below representing the anomaly score at time t−1 as $S_{t-1}$. Here, x, $x_j \in X_{t-1}$, $X_{t-1}$ are training data before $X_t$, and the index j of the sum total of the denominator of the (Formula 2) moves all elements of $X_{t-1}$. In other words, as the anomaly score becomes higher, it is sampled at a higher probability. This process makes it possible to create a new anomaly detection model that decreases the dispersion efficiently by a process described hereinafter. It is noted that, although, in the present embodiment, sampling is performed using a ratio of the anomaly score simply, the sampling may be performed otherwise based on some other distribution such as random distribution. Further, when sampling is performed, not only extracting data from within existing operation data, but also using interpolation values or estimated values may be possible. For example, an oversampling method such as SMOTE (Synthetic Minority Over-sampling Technique, including interpolation using neighborhood points) or a method of learning a creation model such as GAN (Generative Adversarial Networks) from operation data and then performing sampling from within the creation model may be used. This makes it possible to construct an anomaly detection model including information that is not included in operation data, and as a result, in some cases, the detection performance can be improved.

[Expression 2]

$$P(x) = \frac{S_{t-1}(x)}{\sum_{j} S_{t-1}(x_j)}$$

(Formula 2)

$$x, x_j \in X_{t-1}$$

Then, the learning unit 122 of the data management server 12 creates a new anomaly detection model using the training data $X_t$ (S205). This procedure is similar to that in S205. The anomaly score $S_{new}$ of this anomaly detection model is given by the (Formula 3) below. It is noted that, when the distance calculation becomes a bottleneck, a method of approximating distance calculation such as binary hashing or a Product Quantization method (PQ) may be used. By this, the load of the distance calculation can be reduced significantly.

[Expression 3]

$$S_{new}(X_{t\_i}) = \frac{1}{K} \sum_{k=1}^{K} \text{Nearest}(X_t, X_{t\_i}, k)$$

(Formula 3)

$$X_t = \{X_{t\_i} \mid i = 1, \ldots, N\}$$

Then, the learning unit 122 of the data management server 12 combines the anomaly detection model at time t−1 and the newly created anomaly detection model to create the anomaly detection model at time t whose dispersion (variance) is small (S206). The anomaly score $S_t$ of this anomaly detection model is given by the weighted linear sum of the newly created anomaly detection model and the anomaly detection model at time t−1. $S_t$ is given by the following formula. Here, a is selected which indicates the smallest dispersion (variance) of $S_t(X_{t\_i})$ (i=1, 2, . . . , N) when the range from 0 to 1 is line searched with an appropriate step width (for example, 0.01). It is noted that, although, in the present embodiment, the range is from 0 to 1 and the step width is 0.01, a different range or step width may be applied. Further, as described hereinabove, while, in the present embodiment, the variance is used as a scale for evaluating a dispersion, the inter quartile range (IQR) or the like may be used.

[Expression 4]

$$S_t(X_{t\_i}) = S_{t-1}(Xt\_i) + \alpha S_{new}(Xt\_i)$$

(Formula 4)

Then, the learning unit 122 of the data management server 12 increments the variable t representative of time to set t+1 (S207).

Then, the learning unit 122 of the data management server 12 decides whether or not an ending condition is satisfied (S208). It is assumed that, in the present embodiment, an ending condition is satisfied when t becomes higher than a predetermined value T. If a result of the decision does not satisfy the ending condition (S208: NO), then the processing returns to S204, and if the result of the decision satisfies the ending condition (S208: YES), then the processing advances to S209. It is noted that, although it is assumed that, in the present embodiment, the ending condition is satisfied when t becomes higher than the predetermined value T, a different ending condition may be set. For example, the ending condition may be that the variance becomes equal to or lower than a predetermined value, that the variance becomes lower than 10% that of the initial anomaly detection model, or the like.

When the ending condition is satisfied in S208, the learning unit 122 of the data management server 12 creates new training data by weighted sampling of the training data group configuring the anomaly detection model at time t (S209). More specifically, a procedure of selecting training data configuring the anomaly detection model at time t on the basis of a weight (1 where t=0 (fixed), a at each point of time where t>0, this a is represented by ad and extracting one point data (element) at random from within the selected training data is repeated. Here, the probability Q(x) in which $x \in X_h$ (h=0, 1, . . . , T) may be taken from $X_0, X_1, \ldots, X_T$ is represented by the (Formula 5) given below.

[Expression 5]

$$Q(x) = \frac{a_h}{\sum_{j=1}^{T} a_j}$$

(Formula 5)

$$x \in X_h (h = 1, \ldots , T)$$

It is noted that this weight $\alpha_t$ corresponds to the weight ID 304 of the model data 300 depicted in FIG. 5. By repeating this procedure, the dispersion of the anomaly scores becomes smaller between low density or minority operation data in a normal condition and high density or majority operation data in a normal condition.

Finally, the learning unit 122 of the data management server 12 crates an anomaly detection model using the training data created in S208 and ends the present processing (S210).

It is noted that, in this anomaly detection model, the sub model ID 302 is −1 (an anomaly detection model obtained by re-constructing the ensemble model) as described hereinabove.

By the procedure described above, an anomaly detection model in which the dispersion of the anomaly score is small can be configured. Further, by the processes in the steps S209 and S210, an anomaly detection model can be configured which is near to an anomaly detection model at the last point of time and is light in calculation amount. It is noted that these steps described may not be carried out if they are unnecessary. In this case, it is sufficient if the anomaly detection model at the last point of time is used to create an anomaly detection model in later S210.

It is noted that the processing flow described above takes a procedure similar to that of boosting in ensemble learning in the machine learning field. That is, a procedure of adding models one by one is applied. Alternatively, as in bugging in ensemble learning, also it is possible to sample, after a distribution for appropriate sampling is set, a plurality of training data, create the number of anomaly detection models equal to the number of training data, and perform linear sum to calculate an anomaly score.

Next, processing of the monitoring phase in the anomaly detection system is described with reference to FIG. 9. Note that it is assumed that, prior to the processing of the monitoring phase, operation data in the equipment 10 is collected in advance.

First, the detection unit 112 of the controller 11 calculates an anomaly score in an initial stage (referred to as a "initial anomaly score") using an anomaly detection model whose sub model ID 302 is 0, that is, a first anomaly detection model (S301).

Then, the detection unit 112 of the controller 11 calculates an anomaly score using an anomaly detection model whose sub model ID 302 is −1, that is, the last anomaly detection model (S302). It is noted that, when an anomaly detection model whose sub model ID 302 is −1 is not found, an anomaly score is calculated by a procedure similar to that when the anomaly score of the (Formula 4) given hereinabove is calculated.

Then, the detection unit 112 of the controller 11 registers the initial anomaly score and the anomaly score into the anomaly detection result data 400. Further, the detection unit 112 of the controller 11 registers similar data into the integrated data management unit 123 of the data management server 12 through the collection and delivery unit 121 of the data management server 12 (S303).

Then, the detection unit 112 of the controller 11 decides whether or not the anomaly score is higher than a threshold value determined in advance (S304). When the anomaly score is higher than the threshold value (S304: YES), the processing advances to S305. In the other case (S304: NO), the present processing is ended.

When the anomaly score is higher than the threshold value in S304, the detection unit 112 of the controller 11 notifies the display unit 131 of the client terminal 13 that an anomaly has been found. In response to this, the display unit 131 of the client terminal 13 presents information for allowing the user to know a situation of the anomaly of the operation data 100 or the anomaly detection result data 400 to the user (S305).

It is noted that, although, in the present embodiment, it is assumed that the threshold value is determined in advance, the learning unit 122 of the data management server 12 may otherwise set the threshold value automatically in the learning phase on the basis of a statistical method using the operation data in a normal condition or, if available, operation data in an anomaly state. For example, such measures may be taken that the operation data in a normal condition are divided into two and data is learned using one of the divided data while an anomaly score is calculated using the other one of the divided data and then the maximum value of the results of the calculation is determined as a threshold value.

Figure 10:
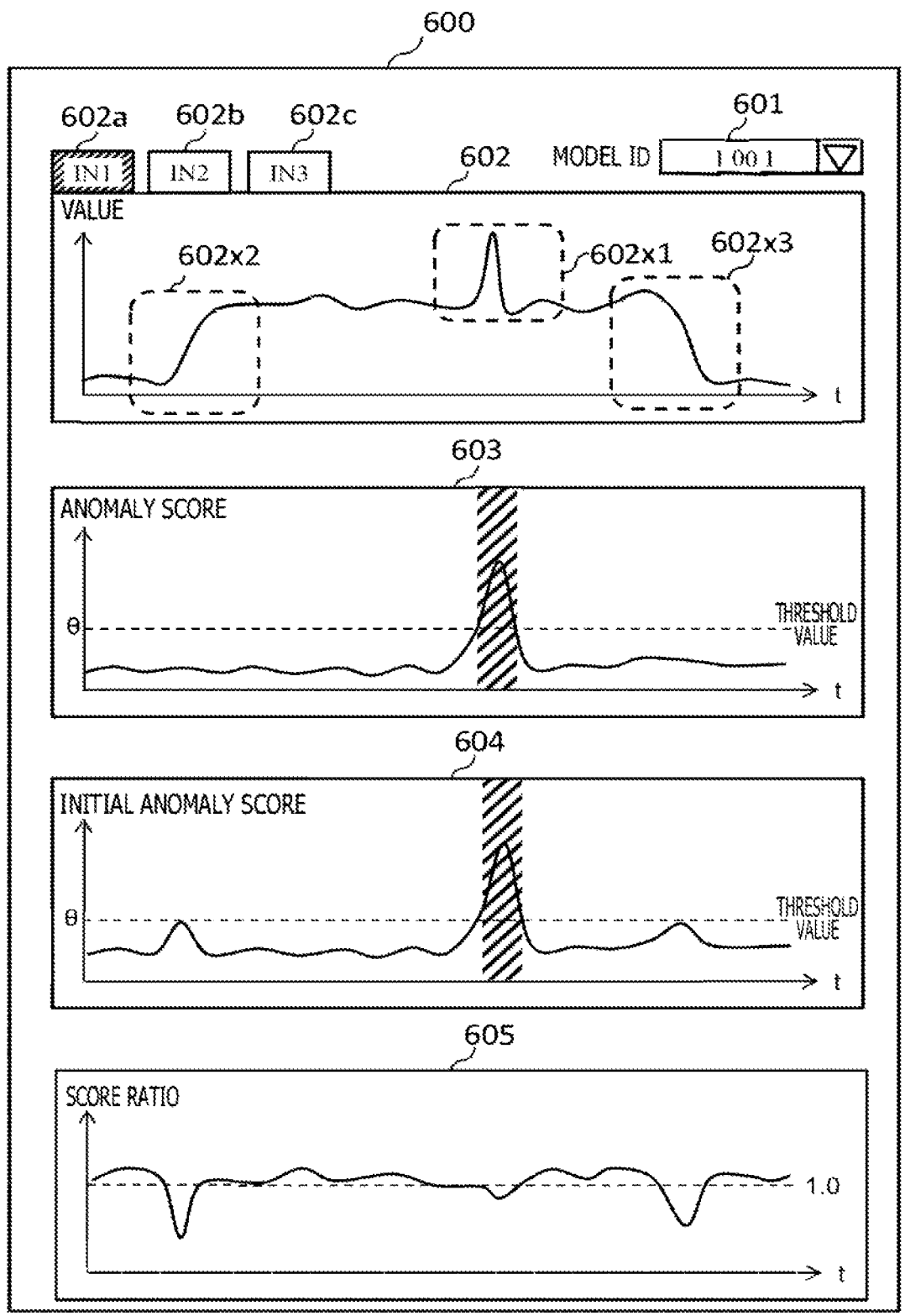
FIG. 10 is a view depicting an example of a monitoring screen image.

Next, a user interface provided by the anomaly detection system is described with reference to FIG. 10.

The display unit 131 of the client terminal 13 presents a monitoring screen 600 to the user of the anomaly detection system and displays information relating to operation data and an anomaly score such that monitoring of the equipment 10 is performed. As depicted in FIG. 10, the monitoring screen 600 includes a model selection combo box 601, an operation data displaying pane 602, an anomaly score displaying pane 603, an initial anomaly score displaying pane 604, and a score ratio displaying pane 605.

In the model selection combo box 601, a model ID corresponding to the model ID 402 of the anomaly detection result data 400 is displayed as a candidate. Information corresponding to the model ID selected by the user here is displayed in the operation data displaying pane 602, anomaly score displaying pane 603, initial anomaly score displaying pane 604, and score ratio displaying pane 605. Note that it is assumed that, even if the user performs no operation, when an anomaly is detected in S304, a model is selected automatically and data is displayed in order to call the user's attention.

In the operation data displaying pane 602, time series data relating to the selected model ID is displayed. The axis of abscissa of a graph displayed indicates time, and the axis of ordinate indicates a value. When there are a plurality of variables, it is possible to display them by switching a tab among a tab 602a, a tab 602b, and a tab 602c. In the example depicted FIG. 10, an operation data is such that a steady operation state is established from a stop state through an activation state (around a frame 602x2) and, after passing an anomaly portion midway (around a frame 602x1), an end state (around a frame 602x3) and returning to a stop state are established.

In the anomaly score displaying pane 603, an anomaly score and a threshold value calculated with an anomaly detection model of the selected model ID are displayed. The axis of abscissa of a graph displayed indicates time, and the axis of ordinate indicates an anomaly score. A portion at which the anomaly score exceeds the threshold value and besides does not coincide with an exception pattern is displayed emphatically. By viewing the information of this pane, the user can grasp whether an anomaly or an omen of an anomaly has occurred.

In the initial anomaly score displaying pane 604, an initial anomaly score and a threshold value calculated with an anomaly detection model of the selected model ID are displayed. The axis of abscissa of a graph depicted indicates time, and the axis of ordinate indicates an anomaly score. A portion at which the anomaly score exceeds the threshold value and does not coincide with an exception patter is displayed emphatically.

In the score ratio displaying pane 605, a ratio of an anomaly score to an initial anomaly score that are calculated with the anomaly detection model of the selected model ID (score ratio=anomaly score/initial anomaly score) are displayed. The axis of abscissa of a graph displayed indicates time, and the axis of ordinate indicates the anomaly score. By viewing the initial anomaly score in the initial anomaly score displaying pane 604 described above and the score ratio, the user can grasp a low-density portion or minority portion. For example, the score ratio corresponding to portions of broken line frames 602x2 and 602x3 is low. This indicates that the activation state, ending state, and so forth of the system at the portions are minorities in comparison with those in the stop state and a steady operation state. In particular, in the present embodiment, it is indicated that an anomaly score is not grasped as an anomaly with respect to the initial anomaly score of a minority portion. Accordingly, when the user analyzes an anomaly of the system, by observing a portion at which the score ratio is low, the user can obtain a suggestion about the portion at which the training data is insufficient.

As described above, according to the present embodiment, the dispersion of the anomaly scores gradually decreases between low density or minority operation data in a normal condition and high density or majority operation data in a normal condition with respect to operation data whose anomaly score used when an anomaly detection model is learned is used and which is normal or is expected to be normal, and as a result, misdetection r of low density or minority operation data in a normal condition decreases, and as a whole, misdetection and loss report can be suppressed low.

Further, by comparing the initial anomaly score and the anomaly score with each other, it becomes possible to grasp what operation data is low density or minority operation data and satisfaction of training data can be decided by the user.

DESCRIPTION OF REFERENCE CHARACTERS

10: Equipment
11: Controller
111: Collection unit
112: Detection unit
113: Local data management unit
12: Data management server
121: Collection and delivery unit
12: Learning unit
123: Integrated data management unit
13: Client terminal
131: Display unit

The invention claimed is:

1. An anomaly detection system that detects an anomaly or an omen of an anomaly of equipment of a monitoring target on a basis of operation data of the equipment, comprising:
a device that collects operation data from the equipment; and
an information processing apparatus that detects an anomaly or an omen of an anomaly on a basis of anomaly detection models constructed from the operation data,
the information processing apparatus including
means for collecting the operation data,
means for learning anomaly detection models from the operation data, and
means for calculating an anomaly score of respective operation data from the operation data and the anomaly detection models, and
means for learning an anomaly detection mode from the operation data and the means for learning anomaly detection models in which a dispersion of elements of the anomaly detection models is small among the anomaly detection models,
wherein the means for learning anomaly detection models from the operation data synthesize an anomaly score of an anomaly detection model generated from a plurality of anomaly detection models by weighted linear sum,
wherein, when a new anomaly detection model is sequentially added to the anomaly detection model, a combination of the anomaly detection models in which the dispersion of the anomaly scores is smallest is searched for within a predetermined search range, and the combination is used for synthesis of the anomaly score of the anomaly detection model.

2. The anomaly detection system according to claim 1, wherein the dispersion of elements of the anomaly detection model is a variance of anomaly scores or an inter quartile range of elements of the anomaly detection model.

3. The anomaly detection system according to claim 1, wherein the means for learning anomaly detection models from the operation data set an initial anomaly detection model, and sequentially re-construct an anomaly detection model in which the dispersion of the anomaly scores is small from the anomaly detection model.

4. The anomaly detection system according to claim 1, wherein the anomaly detection model is an anomaly detection model based on the k-nearest neighbor distance.

5. The anomaly detection system according to claim 1, wherein, the means for learning anomaly detection models from the operation data generate, when generating a new anomaly detection model from a plurality of anomaly detection models, the new anomaly detection model by sampling the operation data from the plurality of anomaly detection models.

6. The anomaly detection system according to claim 1, including means for displaying a ratio of an anomaly score of the anomaly detection model in an initial state to an anomaly score of a re-constructed anomaly detection model.

7. An anomaly detection system that detects an anomaly or an omen of an anomaly of equipment of a monitoring target on a basis of operation data of the equipment, comprising:
a device that collects operation data from the equipment; and
an information processing apparatus that detects an anomaly or an omen of an anomaly on a basis of anomaly detection models constructed from the operation data,
the information processing apparatus including
means for collecting the operation data,
means for learning anomaly detection models from the operation data, and
means for calculating an anomaly score of respective operation data from the operation data and the anomaly detection models, and
means for learning an anomaly detection mode from the operation data and the means for learning anomaly detection models in which a dispersion of elements of the anomaly detection models is small among the anomaly detection models,
wherein the means for learning anomaly detection models from the operation data synthesize an anomaly score of an anomaly detection model generated from a plurality of anomaly detection models by weighted linear sum,
wherein, the means for learning anomaly detection models from the operation data generate, when generating a new anomaly detection model from a plurality of anomaly detection models, the new anomaly detection model by sampling the operation data from the plurality of anomaly detection models,
wherein the means for learning anomaly detection models from the operation data perform the sampling with a high probability for an anomaly detection model whose anomaly score is high.

8. An anomaly detection system that detects an anomaly or an omen of an anomaly of equipment of a monitoring target on a basis of operation data of the equipment, comprising:
a device that collects operation data from the equipment; and
an information processing apparatus that detects an anomaly or an omen of an anomaly on a basis of anomaly detection models constructed from the operation data,
the information processing apparatus including
means for collecting the operation data,
means for learning anomaly detection models from the operation data, and
means for calculating an anomaly score of respective operation data from the operation data and the anomaly detection models, and means for learning an anomaly detection mode from the operation data and the means for learning anomaly detection models in which a dispersion of elements of the anomaly detection models is small among the anomaly detection models,
wherein the means for learning anomaly detection models from the operation data synthesize an anomaly score of an anomaly detection model generated from a plurality of anomaly detection models by weighted linear sum,
wherein, the means for learning anomaly detection models from the operation data generate, when generating a new anomaly detection model from a plurality of anomaly detection models, the new anomaly detection model by sampling the operation data from the plurality of anomaly detection models,
wherein the means for learning anomaly detection models from the operation data perform the sampling by any one of sampling performed based on a random distribution, sampling using an interpolation value or an estimation value, and sampling from a result of learning of a generation model from the operation data.

* * * * *